United States Patent [19]
Furth et al.

[11] Patent Number: 5,684,378
[45] Date of Patent: Nov. 4, 1997

[54] RECHARGEABLE FLASHLIGHT ASSEMBLY

[75] Inventors: David A. Furth, Skaneateles; Mark A. Ferguson, Jamesville; Peter F. Lynch; Scott W. Osiecki, both of Skaneateles, all of N.Y.; Kang Woon Au, Ho Man Tin, Hong Kong

[73] Assignee: Eveready Battery Company, St. Louis, Mo.

[21] Appl. No.: 372,172

[22] Filed: Jan. 12, 1995

[51] Int. Cl.$^6$ ................................................... H01M 10/46
[52] U.S. Cl. .................................................. 320/2; 362/183
[58] Field of Search ........................... 320/2, 5; 362/183, 362/202

[56] References Cited

U.S. PATENT DOCUMENTS

| | | |
|---|---|---|
| D. 221,248 | 7/1971 | Angibaud . |
| D. 228,519 | 10/1973 | Moore . |
| D. 233,469 | 10/1974 | Moore . |
| D. 240,550 | 7/1976 | Brindley . |
| D. 241,971 | 10/1976 | Brindley . |
| D. 271,807 | 12/1983 | Sassmannshausen . |
| D. 294,869 | 3/1988 | Kwan . |
| D. 299,274 | 1/1989 | Ohashi . |
| D. 308,253 | 5/1990 | Battles et al. . |
| D. 312,138 | 11/1990 | Burns . |
| D. 314,057 | 1/1991 | Naldi . |
| D. 315,609 | 3/1991 | Garrity . |
| D. 321,785 | 11/1991 | Garrity . |
| D. 324,580 | 3/1992 | Young . |
| D. 325,100 | 3/1992 | Usami . |
| D. 343,018 | 1/1994 | Garrity . |
| D. 343,019 | 1/1994 | Garrity . |
| D. 344,811 | 3/1994 | Garrity . |
| 3,144,993 | 8/1964 | Sassmannshausen . |
| 3,711,703 | 1/1973 | Bacevius . |
| 3,794,824 | 2/1974 | Bacevius . |
| 3,976,986 | 8/1976 | Zabroski .......................... 307/66 X |
| 4,647,832 | 3/1987 | Fenne et al. ...................... 320/2 |
| 4,743,829 | 5/1988 | Fenne et al. ...................... 320/2 |
| 4,794,315 | 12/1988 | Pederson et al. ................ 320/2 |
| 4,914,555 | 4/1990 | Gammache .................... 362/183 |
| 5,006,779 | 4/1991 | Fenne et al. ................... 320/2 |

FOREIGN PATENT DOCUMENTS

| | | |
|---|---|---|
| 960624 | 1/1975 | Canada . |
| 994737 | 8/1976 | Canada . |
| 994738 | 8/1976 | Canada . |
| 2195775 | 3/1974 | France . |
| 2353572 | 7/1975 | Germany . |

*Primary Examiner*—Edward Tso
*Attorney, Agent, or Firm*—Robert W. Welsh; S. Allan Fraser

[57] ABSTRACT

A rechargeable flashlight is provided comprising in combination a tubular housing open at one end and closed at an opposite end. An integral lamp assembly and power supply circuit are slidably received within the tubular housing. An electrical connector is provided at the closed end of the tubular housing to selectively interconnect the power supply circuit to an external electrical power source, such as an AC socket, to recharge the battery. In a second position, the electrical connector is disconnected from the power supply circuit, and power is provided by the rechargeable battery. The open end of the tubular housing is closed by a removable lens assembly, concentrically receiving a lamp extending from the integral lamp assembly, for organizing the light produced by the lamp into a beam. The lamp assembly and power supply circuit may be formed as an integral unit and detachably fixed within the flashlight casing or housing so that the operator may remove the lamp assembly and power supply circuit as a unit. Any electrical connection between the external AC power supply and the flashlight circuit is interrupted when the lamp assembly and power supply circuit are removed from the flashlight casing. Thus, in contrast to conventional rechargeable flashlights, when the rechargeable battery within the flashlight no longer operates, it may be removed from the flashlight and disposed of properly. A replacement battery may be obtained at a fraction of the cost of the flashlight, reinserted into the circuit, and reinstalled in the flashlight. In this manner, the substantial portion of the flashlight is conserved, wherein in the prior units the entire flashlight was disposed of, often improperly, with the rechargeable battery therein and presenting an environmental safety hazard.

22 Claims, 4 Drawing Sheets

RECHARGEABLE FLASHLIGHT ASSEMBLY

BACKGROUND OF THE INVENTION

This invention relates generally to flashlights and, more particularly, to a rechargeable flashlight having a replaceable battery.

Conventional flashlights have been powered by expendable dry cell bakeries. In an effort to reduce the cost associated with replacing the expendable dry cells, rechargeable batteries were developed. Once the batteries were discharged, they were removed from the flashlight and recharged for later use. The disadvantage associated with such rechargeable cells is me need for me flashlight owner to also possess a battery recharger, separate and apart from the flashlight. The separate battery charger was often an additional expense and used valuable work space. The battery rechargers also pose a safety hazard since some bakeries have been known to leak or explode as a result of overcharging.

In an effort to remove these intermediary steps, flashlights were developed which contained rechargeable batteries in a sealed flashlight container. When the battery became discharged to a point where the flashlight was inoperable, the operator simply plugged the flashlight into an electrical outlet for a period of time until the battery was recharged. The flashlight was then disconnected from the outlet and used in a conventional manner until the battery again was discharged. A disadvantage associated with this product is that once the rechargeable battery is no longer capable of handling a charge, the flashlight is disposed of because no provision is made to replace the rechargeable battery. The flashlight is simply thrown away in the trash and disposed of in landfills and other waste disposal systems. The rechargeable batteries contained within those systems present an environmental hazard and safety issue. Another disadvantage is that even though the battery was inoperative, the entire flashlight housing was disposed of, resulting in waste and increased cost to the flashlight owner because an entirely new flashlight needed to be purchased. To date, no one has provided a flashlight having a rechargeable battery which may be replaced when it becomes inoperative and disposed of properly in order to remove any environmental or safety issues associated with disposal. The instant invention addresses these environmental and cost-conservation issues created by conventional, rechargeable flashlights.

SUMMARY OF THE INVENTION

In its broadest sense, one embodiment of the invention provides a rechargeable flashlight wherein the rechargeable battery within the flashlight may be removed and recycled when it is no longer operative and be replaced by a new rechargeable battery.

In another embodiment of the invention, a flashlight is provided which comprises in combination a flashlight casing open at one end and defining an interior chamber configured to receive an integral power supply and lamp assembly detachably fixed therein. The power supply includes a rechargeable battery mounted thereon which may be replaced once it becomes unable to sustain a charge. Also disposed within the flashlight casing is an electrical connector configured to move between a first and second position so as to selectively place the power supply within the flashlight in connection with an AC power source for recharging the battery.

In yet another form of the invention, a rechargeable flashlight is provided comprising in combination a tubular housing open at one end and closed at an opposite end. An integral lamp assembly and power supply circuit are slidably received within the tubular housing. An electrical connector is provided at the closed end of the tubular housing to selectively interconnect the power supply circuit to an external electrical power source, such as an AC socket, to recharge the battery. In a second position, the electrical connector is disconnected from the power supply circuit, and power is provided by the rechargeable battery. The open end of the tubular housing is closed by a removable lens assembly, concentrically receiving a lamp extending from the integral lamp assembly, for organizing the light produced by the lamp into a beam. The lamp assembly and power supply circuit may be formed as an integral unit and detachably fixed within the flashlight casing or housing so that the operator may remove the lamp assembly and power supply circuit as a unit. Any electrical connection between the external AC power supply and the flashlight circuit is interrupted when the lamp assembly and power supply circuit are removed from the flashlight casing. Thus, in contrast to conventional rechargeable flashlights, when the rechargeable battery within the flashlight no longer operates, it may be removed from the flashlight and disposed of properly. A replacement battery may be obtained at a fraction of the cost of the flashlight, reinserted into the circuit, and reinstalled in the flashlight. In this manner, the substantial portion of the flashlight is conserved, wherein in the prior units the entire flashlight was disposed of, often improperly, with the rechargeable battery therein and presenting an environmental safety hazard.

DETAILED DESCRIPTION OF THE DRAWING FIGURES

A better understanding of the invention and the advantages provided thereby may be obtained by reference to the specification and the attached drawing figures, wherein.

DETAILED DESCRIPTION

Figure 1:
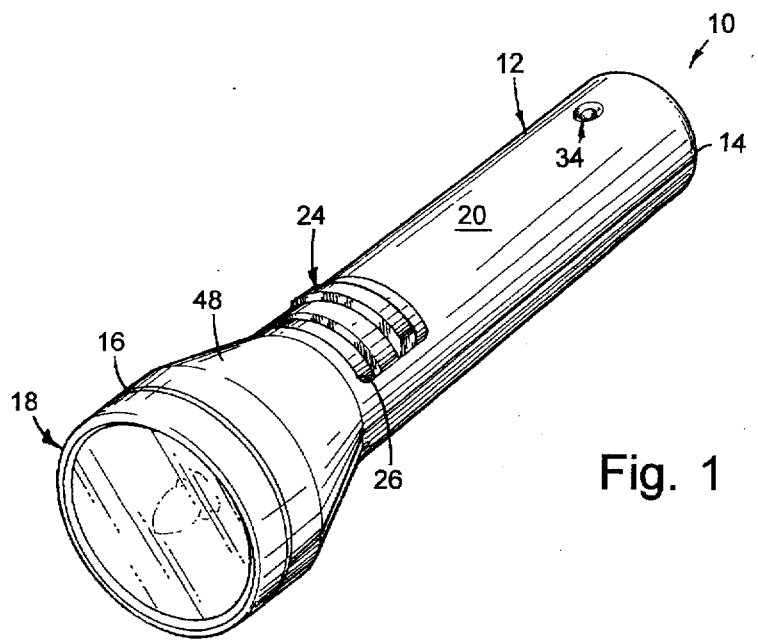
FIG. 1 is a perspective view of a flashlight embodying the instant invention.
Figure 2:
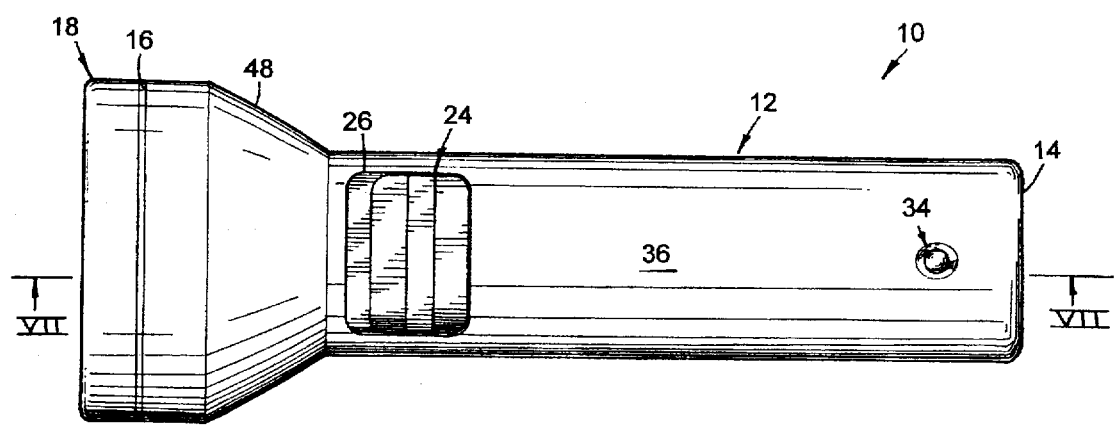
FIGS. 2–4 are a plan view, side view, and bottom view, respectively, of the sides of the rechargeable flashlight.
Figure 3:
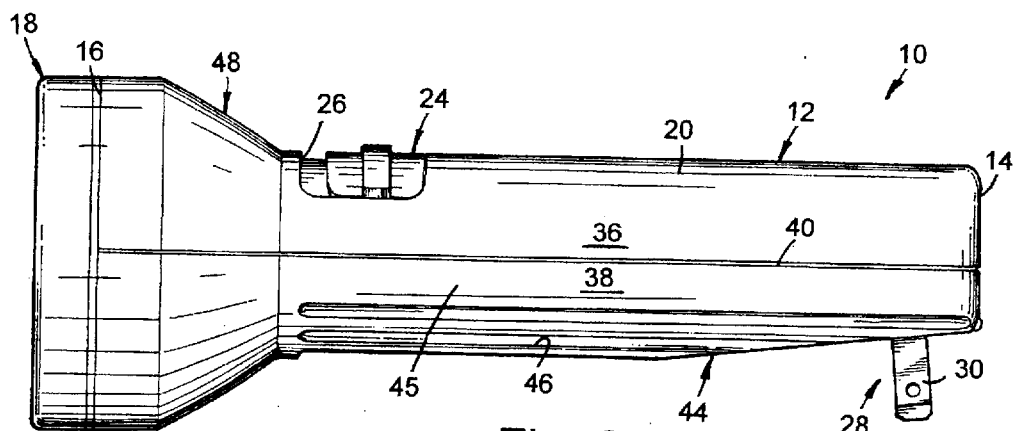
Figure 4:
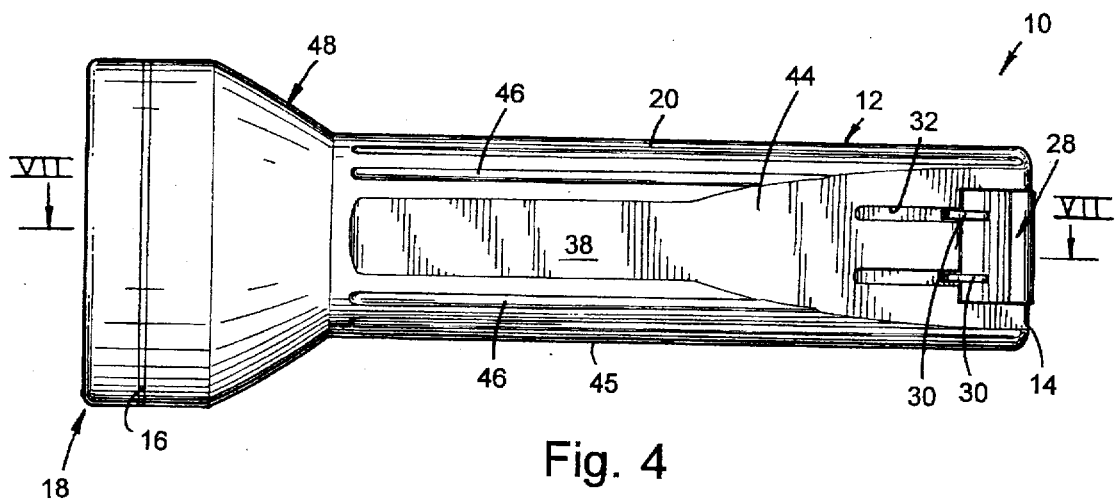
Figure 5:
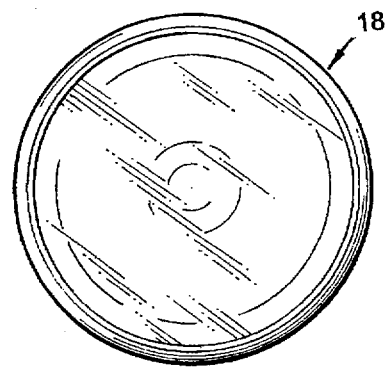
FIGS. 5 and 6 are opposing end views of the flashlight.
Figure 6:
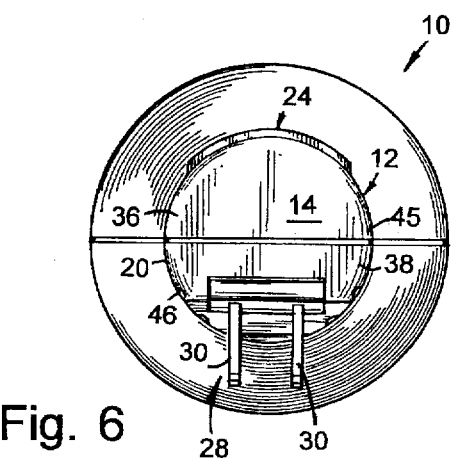

For the purposes of the following description, the terms "upper," "lower," "right," "left," "front," "rear,"" vertical," "horizontal," and derivatives or equivalents thereof shall relate to the invention as oriented in FIG. 3. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

Figure 7:
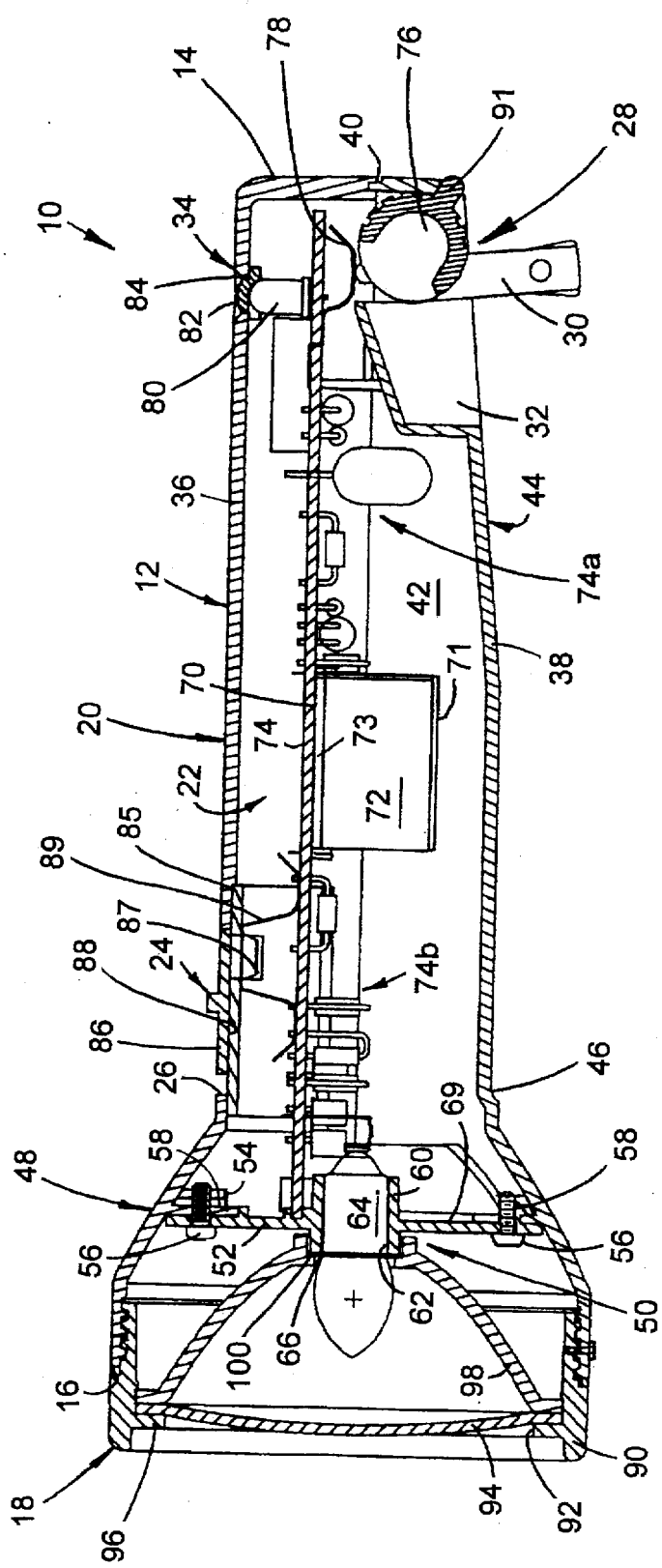
FIG. 7 is an elevational section view taken along line VII—VII shown in FIGS. 2 and 4.

Referring to FIGS. 1–6, a flashlight 10 embodying the instant invention includes a flashlight casing or housing 12 closed at a first end 14 and receiving a lens assembly 18 at an opposite end 16. The flashlight casing includes a generally tubular, elongate body 20 defining an interior chamber 22 (FIG. 7). The diameter of tubular body 20 is substantially constant along most of its length, and includes an outwardly tapering, frusto-conical portion 48, proximate end 16 to accept and accommodate the lens assembly 18. Contained by body 20, and extending into the interior chamber 22, is a switch assembly 24 slidably disposed within opening 26. The switch assembly 24, described in greater detail below, is configured to translate between first and second positions within opening 26 to turn the flashlight 10 on and off. Also mounted within housing or casing 12, proximate the first or closed end 14, is an electrical connector 28, preferably a two-prong male connector conventionally used to complete an electrical connection with a female socket. Electrical connector 28 is configured to move between a first position extending from casing 12, to a second, retracted position where the prongs 30 are received within recesses 32 formed within the tubular body 20. Electrical connector 28 may be polarized in a well-known manner by providing different sized prongs. Also provided in housing 12 is an indicator port 34 to signal when the flashlight is coupled to an AC power supply or socket to recharge the flashlight.

The housing 12 may be made from a variety of materials including machined steel, aluminum, and brass, but is preferably made from a polymeric material such as high-impact ABS plastic or the like. More preferably, the flashlight casing or housing 12 is molded into an upper and lower half 36, 38, respectively, which may be interconnected and ultrasonically welded together along joint line 40 to form the flashlight casing or housing 12 and the tubular body 20. Using components molded from polymeric material, halves 36 and 38 may be formed such that the walls 42 of each half may wrap around the first end 14 to close that end. Additionally, a portion 44 of the exterior surface 45 of the lower half 38 of the housing 12 may have a flat spot formed thereon at an angle formed by a line generally extending from the peripheral edge of first end 14 to the periphery of the frusto-conical portion 48 to permit the flashlight 10 to rest against the outlet fixture or wall when coupled to a conventional AC outlet. Additionally, the exterior surface 45 of the tubular body 20 or casing 12 may be textured including stippling, channels, or other types of structures to improve the feel and grip of the flashlight body by the user. For example, as shown in FIGS. 3, 4, 6, and 7, the exterior 45 of lower housing 38 includes generally parallel channels 46 extending substantially the length of tubular body 20 and terminating proximate the base of the frusto-conical portion 48 at one end and at the intersection with the flat spot 44 toward the opposite end 14 proximate plug 28.

Disposed within flashlight 10 (FIG. 7) generally along the interior of frusto-conical portion 48 is a lamp assembly 50. Lamp assembly 50 generally includes a mounting plate 52 preferably formed from ABS plastic and having a diameter substantially equal to the inside diameter of the frusto-conical portion 48. One side of plate 52 butts against bosses 54 extending from the interior wall of the frusto-conical portion 48. Bosses 54 may have holes to receive each fastener, but preferably retain a metal fastener such as a square nut. The screws 56 preferably extend through mounting plate 52 and into nuts 58 retained by the bosses 54. Mounting plate 54 also includes a tubular barrel 60 extending therethrough and having an interior wall 62 of sufficient diameter to receive a conventional flashlight bulb 64. The light bulb or lamp 64 is located within the barrel 60 by a flange extending from the light bulb base and engaging one end of the barrel, such as indicated at 66. The opposite end 67 of the barrel 60 has a portion of the wall removed to produce a gap in the barrel. The gap permits one of the electrical contacts to engage the side of the lamp 64. The tip of the lamp engages a second electrical contact in order to complete the electrical circuit with the lamp. These details will be more apparent below.

Figure 8:
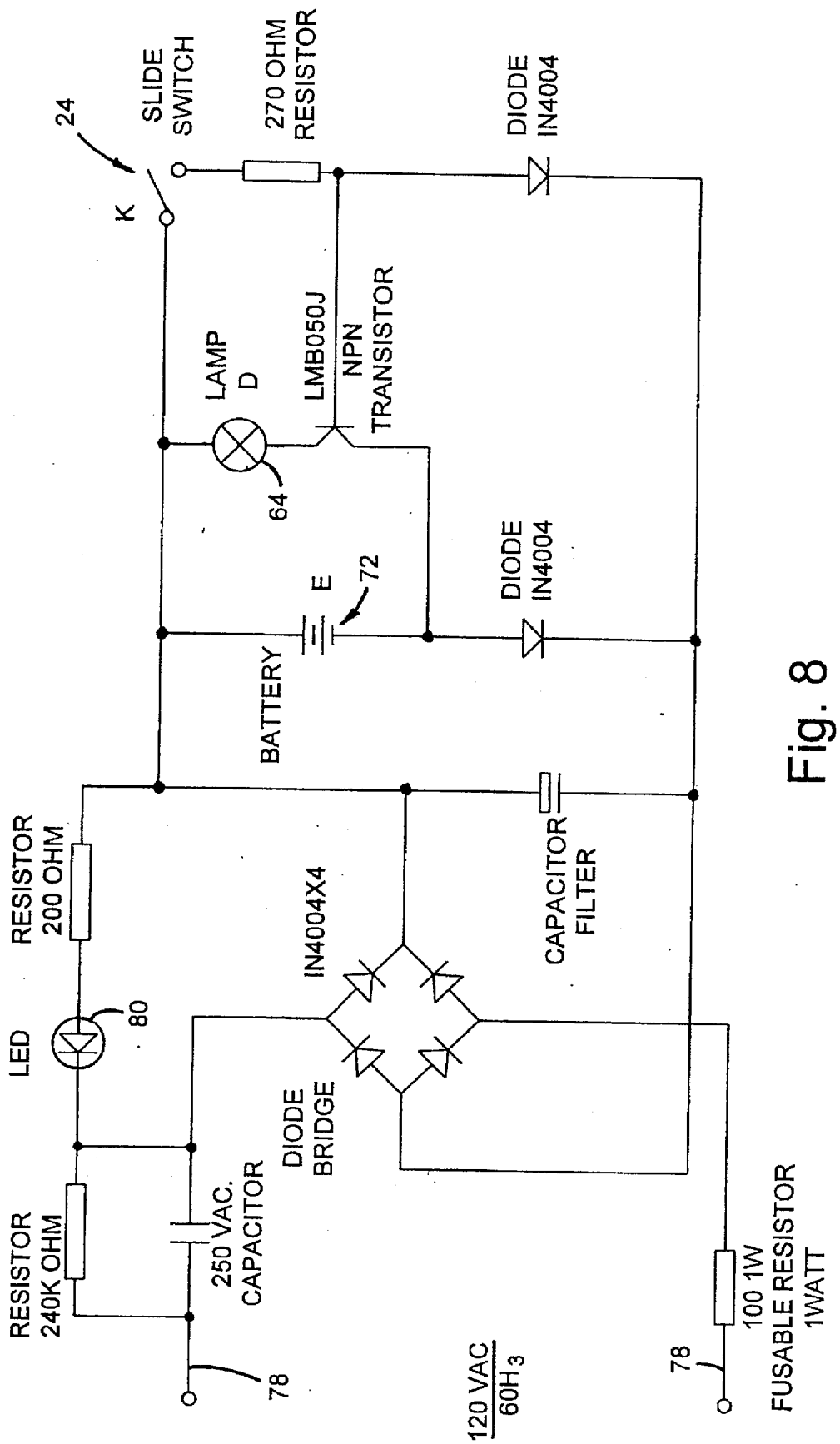
FIG. 8 is a general, schematic diagram of the power supply circuit for the flashlight.

Extending from side 69 of mounting plate 52, is a circuit board 70 containing an electrical circuit 74a, shown in FIG. 8, for powering the lamp 64. The circuit board 70 has one end connected to the back 69 of mounting plate 54 and extend substantially the length of tubular body 20 with the opposite end terminating proximate the interior wall of the closed end 14. The circuit board also includes a disposable, rechargeable battery 72, which may be removably mounted between battery terminals 71 and 73, each of which is operably coupled to the light bulb or lamp 64 mounted in the lamp assembly 50 through circuit 74b and also to a recharging circuit 74a (FIG. 8) selectively placed in communication with the electrical connector 28, described in greater detail below. Battery 72 may be a rechargeable nickel cadmium battery having a voltage output compatible with the light bulb or lamp 64. Additionally, the circuit 74b interconnecting the rechargeable battery 72 with the light bulb 64 may match the voltage requirement of the lamp 64.

Recharging circuit 74 is selectively connected to electrical connector 28 extending from the first end 14 of the flashlight housing 12. The electrical connector 28 includes prongs 30 which are mounted to a rotating drum or roller 76 journaled within the lower half 38 of the tubular body 20. When roller 76 is rotated to a first position, contacts 78 of the recharging circuit engage the ends of the prongs 30, and when rotated to a second position, the prongs 30 are moved to a stowed position within the recesses 32, and the contacts 78 are disconnected from the ends of the prongs 30 to interrupt the recharging circuit 74. The recharging circuit 74b and power supply circuit 74a on the circuit board 70 may be in any one of a number of configurations so long as board 70 recharges battery 72 and provides electrical power to the lamp 74 from the battery 72 when disconnected from the AC source. It is preferred that a light-emitting diode 80 (LED) be operably coupled to the recharging circuit on board 70 and extend proximate a lens 82 spanning opening 84 formed in the tubular housing 20 for the charging indicator 34. It is preferred that diode 80 illuminate when an AC voltage is applied to the recharging circuit through the electrical connector 28 to indicate that the battery is being recharged and that there is a relatively high voltage existent inside the flashlight casing.

Interacting with the power supply circuit 74b, and selectively providing power from battery 72 to lamp 64, is switch assembly 24. The switch assembly 24 includes a switch plate 85 fixed to the interior wall 42 of half 36 and overlying and closing the opening 26 provided for the switch assembly. The switch slide 86 is provided which is generally rectangular in plan view and curved in elevation view to substantially conform to the general, cylindrical shape of the flashlight housing or tubular body 20. A projection 87 extends from the concave side 88 of the slide 86 which extends through a slot in the switch plate 85. A contact strip 89 preferably made from 0.3 mm phosphate bronze is press-fit over the detent or post 87 extending from the slide 86. Flanges extending from the contact strip 89 retain the strip on the post 87. The contact strip 89 includes a pair of legs which slidably engage electrical contacts formed on the circuit board 70 to open and close the circuit to the lamp 64 when the flashlight is assembled.

Closing the second end 16 of the flashlight casing 12 is the lens assembly 18, briefly mentioned above. Lens assembly 18 includes a lens ring 90 molded from ABS plastic and having one end threadably engaging the open end 16 of the flashlight. Disposed within the lens ring 90 and spanning an opening 92 formed by flange or ring 96 is a polymeric or glass lens 94. Lens 94 may be configured to disperse or refract light produced by the lamp 64 in a predetermined pattern including a fresnel-type structure to collimate the beam produced by lamp 64. Adjacent lens 94, and urging lens 94 against flange 96, is one edge of a reflector 98, such as commonly used in flashlight designs. The reflector includes a central opening 100 concentric with lens 94 and configured to receive a portion of lamp 64 so as to locate the light-emitting element of the lamp generally at a focal point of the reflector so that light produced by the lamp is reflected to form a beam of light emitting from the end of the flashlight.

In assembling the rechargeable flashlight, the lower half of the housing 38 receives the roller or drum 76 in a manner to allow the drum 76 to rotate about its longitudinal axis and permit the plug 30 to rotate from an extended position to a retracted position within the recess 32. The upper half of the housing 36 is fitted with the LED lens 82 as well as the switch assembly 24. With the switch assembly 24 mounted to the upper housing half 36, the LED lens 82 cemented over the opening 84, and the rotating drum 76 journaled in the lower housing 38, the two housing halves are joined together along joint 40 and ultrasonically welded together to provide an integral flashlight housing closed at end 14 and open at the opposite end 16, defining the interior cavity 22.

In another operation, the circuit board 70 receives all of the components comprising the recharging and power supply circuit 74 in a conventional manner. Circuit board 70 is then coupled at one end to the backside 69 of the mounting plate 52 by rivet, cement, or other suitable fastener. Mounting plate 52 and circuit 74 on board 70 are then slidably received in the tubular housing 20 such that circuit board 70 extends substantially the length of the tubular portion of the body 20, and such that side 69 of mounting plate 52 butts against bosses 54 extending from the interior surface of the frusto-conical portion 48. In this configuration, LED 80 is placed directly adjacent lens 82 in opening 84, contacts 78 are located appropriately to be selectively engaged by the terminal ends of plugs 30 fixed to drum 76, and the electrical contacts of the circuit 74a are located adjacent the contacts of the switch assembly 24. Fasteners 56 extend through plate 52 and are threaded into nuts 58 to firmly anchor the lamp assembly 50 and circuit board 70 within the interior of the flashlight. Also in this configuration, lamp 64 is received within barrel 60 such that a side terminal of the lamp is engaged by one contact of the operating circuit, and the end terminal of the lamp is engaged by a second contact of the operating circuit. With the internal components of the rechargeable flashlight in place, the lens ring 90, complete with lens 94 and reflector 98, is threadably received over the open end 16 such that lamp 64 is received through the opening 100 in reflector 98 when lens ring 90 is tightly threaded in place. In a preferred embodiment, the lens ring is secured to the end 16 by a threaded fastener.

In operation, the rechargeable battery is typically discharged when the product is shipped. To charge the battery, the consumer rotates drum 76 with the aid of flange 91 about its axis to place plugs 30 in their extended position generally perpendicular to the tubular body 20. In this configuration, the plugs may be mated with a female receptacle of an AC outlet to provide current to the recharging circuit 74a. The AC voltage on the recharging circuit 74a causes the LED 80 to illuminate to signal to the operator that the flashlight is connected to an AC circuit. After a period of time has lapsed to assure that rechargeable battery 72 is completely charged, flashlight assembly 10 may be removed from the AC power supply. Drum 76 is then rotated to retract plugs 30 into the recesses 32. The operator may then illuminate the lamp 64 by sliding the switch assembly 24 to an ON position, causing the contacts to complete the circuit. The operator may move the switch to the OFF position to open the circuit when he is finished with the lamp, thus removing the load on the battery. When the battery needs to be recharged, indicated by the low light emitted from the lamp or the inability to light the lamp 64, the operator may then extend the plugs 30 from the housing and connect the flashlight back to the AC power supply.

The advantage provided by this invention is that when the rechargeable battery 72 is no longer able to receive a charge or maintain that charge for a reasonable amount of time so that the flashlight may be properly operated, the operator may disassemble the flashlight by removing the fastener through the lens ring 90 and un-thread the lens ring to provide access to the lamp assembly 50. The fasteners 56 retaining the lamp assembly 50 against bosses 54 may be unscrewed to permit the lamp assembly 50 and circuit board 70 to be withdrawn from the body of the flashlight 20. The operator may then remove the nonfunctioning, rechargeable battery and properly dispose of it. A replacement battery may be obtained and reinserted in the circuit on board 70. The lamp assembly 50 and board 70 may then be reinserted into the flashlight body. The lens ring 90 may then be reattached, repositioning the lamp at the appropriate focal point of the reflector for normal use. The flashlight may then be coupled to the AC source to fully charge the new, rechargeable battery.

The instant invention results in a substantial saving and conservation of material since only the battery is replaced. The flashlight body, lens assembly, lamp, and circuit are reused. An additional advantage provided by this invention is that the circuit board or lamp assembly may be replaced as an integral unit, if for some reason a defect exists in the circuit board resulting in substantially reduced repair costs. Yet another advantage provided by this invention is a reduced risk of electrical shock if for some reason the operator wanted to remove the circuit board and lamp assembly 50 from the flashlight while the flashlight was connected to the AC power supply. When fasteners 56 are removed, the lamp assembly and circuit board are withdrawn from the tubular casing, the contacts 78 disengage the terminal ends of the plugs 30, interrupting the flow of relatively high voltage to the recharging circuit. Moreover, by locating the electrical connector 28 at the closed end of the flashlight housing, the mounting plate makes it extremely difficult to extend a finger into contact with the electrical circuit.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A flashlight, comprising in combination:

a flashlight casing open at one end and defining an interior chamber;

a lamp assembly detachably fixed to said one end of said flashlight casing;

a rechargeable battery adapted to provide power to said lamp assembly;

an electrical circuit attached to said lamp assembly and slidably disposed within said interior chamber, operably interconnecting said lamp assembly and said rechargeable battery, for providing power from said rechargeable battery to said lamp assembly and configured to effect a recharge of said rechargeable battery;

an electrical connector selectively connected to said electrical circuit for operably coupling said electrical circuit to an electrical outlet to recharge said rechargeable battery; and said electrical circuit configured to be removed from said flashlight casing to provide access to said rechargeable battery such that said rechargeable battery may be replaced and disposed of properly.

2. The flashlight of claim 1, wherein said lamp assembly includes:

a mounting plate detachably coupled to said flashlight casing; and a socket for receiving a light bulb disposed thereon.

3. The flashlight as defined in claim 2, wherein said electrical circuit includes a circuit board attached adjacent one edge to a side of said mounting plate opposite said socket.

4. The flashlight as defined in claim 1, wherein said electrical connector includes:

a pair of electrical contacts configured to extend from said flashlight casing in a first position to engage an electrical receptacle for providing an electrical current to said electrical circuit, and rotate with respect to said housing to a second position generally parallel to said flashlight casing and disconnected from said electrical circuit.

5. The flashlight as defined in claim 1, wherein said rechargeable battery is detachably coupled to said electrical circuit.

6. The flashlight as defined in claim 2, further including a lens assembly detachably sealing said one end of said flashlight casing, said lens assembly having a reflector concentrically receiving said lamp therethrough.

7. The flashlight as defined in claim 1, further including a switch extending through said flashlight casing and selectively interconnecting a pair of electrical contacts on said electrical circuit for providing electrical power to said lamp assembly.

8. The flashlight as defined in claim 1, wherein said lamp assembly includes a handle for inserting and removing said lamp assembly and electrical circuit with respect to said interior chamber of said flashlight casing.

9. The flashlight as defined in claim 2, wherein said mounting plate is attached to said flashlight casing by at least one releasable fastener for preventing accidental access to said electrical circuit while said rechargeable battery is being recharged.

10. A flashlight, comprising in combination:

a tubular housing open at one end and closed at an opposite end;

an integral lamp and power circuit slidably disposed within said tubular housing and configured to be removed from said tubular housing;

an electrical connector on said tubular housing and operably interconnected to said integral lamp and power circuit in a first position and disconnected from said integral lamp and power circuit in a second position; and a lens assembly detachably received on said open end and closing said tubular housing, and concentrically receiving a lamp extending from said integral lamp and power unit, for organizing light produced by said lamp into a beam of light.

11. The flashlight as defined in claim 10, wherein said integral lamp and power circuit includes:

a lamp assembly;

a rechargeable battery for powering said lamp assembly; and a recharging circuit operably interconnecting said lamp, rechargeable battery, and said electrical connector to effect recharging of said rechargeable battery as well as provide power from said rechargeable battery to said lamp assembly.

12. The flashlight as defined in claim 11, wherein said lamp assembly includes:

a plate configured to be received within and removably block at least a portion of said tubular housing;

a light bulb socket extending from one side of said plate facing said open end, and said recharging circuit extending from a side facing said closed end; and a handle extending from said one side of said plate facing said open end of said tubular housing.

13. The flashlight as defined in claim 12, wherein said plate is fastened to said tubular housing to prevent accidental access to said recharging circuit while said rechargeable battery is being recharged.

14. The flashlight as defined in claim 13, wherein said rechargeable battery is detachably coupled to said recharging circuit by a conductive seat at one end of said rechargeable battery and a conductive bracket at an opposite end such that said rechargeable battery may be removed and replaced when said rechargeable battery is defective or no longer operable.

15. A rechargeable flashlight, comprising in combination:

a body having a closed first end and an open second end;

a rechargeable battery;

a circuit assembly configured to receive said rechargeable battery thereon for recharging said battery once it has been discharged;

an electrically energized light operably coupled to said circuit assembly to be powered by said battery;

a mounting plate coupled to said light source and to said circuit assembly;

a flashlight housing having a first closed end and an open second end configured to receive said circuit assembly, light source, and said mounting plate, and permit easy ingress and egress of same with respect to said flashlight housing;

a lens assembly detachably coupled to and closing said second end of said flashlight housing; and a plug assembly disposed in said first end of said housing for connection to an AC source to provide a bias to said circuit assembly and operate said light and recharge said battery.

16. A flashlight having a housing open at one end and defining an interior chamber, a lamp assembly detachably coupled to the one end of said flashlight casing, comprising:

an electrical circuit including a circuit board attached to the lamp assembly and disposed within the housing, operably interconnecting the lamp assembly to a rechargeable battery located within the housing; and an electrical connector selectively connected to said electrical circuit and operably coupling said electrical circuit to an electrical outlet to recharge said rechargeable battery, said electrical circuit configured to be slidably removed from said flashlight casing to provide access to said rechargeable battery such that said rechargeable battery may be replaced.

17. The flashlight as defined in claim 16, wherein said electrical connector includes:

a pair of electrical contacts configured to extend from the flashlight casing in a first position to engage an electrical receptacle for providing an electrical current to said electrical circuit, and rotate with respect to said housing to a second position generally parallel to said flashlight casing and disconnected from said electrical circuit.

18. The flashlight as defined in claim 16, wherein said rechargeable battery is detachably coupled to said electrical circuit.

19. The flashlight as defined in claim 16, further including a switch extending through the flashlight casing and selectively interconnecting a pair of electrical contacts on said electrical circuit for providing electrical power to the lamp assembly.

20. A flashlight having a housing open at one end;

a power circuit slidably disposed within the housing and configured to be removed from the housing;

an electrical connector extending through the housing and interconnected to the power circuit; and a lamp assembly detachably closing the housing and connected to said power circuit.

21. The flashlight as defined in claim 20, wherein said power circuit includes:

a rechargeable battery for powering said lamp assembly; and a recharging circuit operably interconnecting said lamp, rechargeable battery, and said electrical connector to effect recharging of said rechargeable battery as well as provide power from said rechargeable battery to said lamp assembly.

22. The flashlight as defined in claim 21, wherein said rechargeable battery is detachably coupled to said recharging circuit such that said rechargeable battery may be removed and replaced when said rechargeable battery is no longer operable.

* * * * *